United States Patent
Geng et al.

(10) Patent No.: US 10,809,102 B2
(45) Date of Patent: Oct. 20, 2020

(54) ANGLE SENSOR AND ANGLE MEASUREMENT METHOD BASED ON EDDY CURRENT EFFECT

(71) Applicant: GREE ELECTRIC APPLIANCES, INC. OF ZHUHAI, Zhuhai, Guangdong (CN)

(72) Inventors: Jiqing Geng, Zhuhai (CN); Weicai Huang, Zhuhai (CN); Weihao Yin, Zhuhai (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 127 days.

(21) Appl. No.: 15/775,865

(22) PCT Filed: Sep. 29, 2016

(86) PCT No.: PCT/CN2016/100802
§ 371 (c)(1),
(2) Date: May 24, 2018

(87) PCT Pub. No.: WO2017/080329
PCT Pub. Date: May 18, 2017

(65) Prior Publication Data
US 2018/0328761 A1   Nov. 15, 2018

(30) Foreign Application Priority Data
Nov. 13, 2015   (CN) .......................... 2015 1 0785432

(51) Int. Cl.
*G01D 5/245* (2006.01)
*G01B 7/30* (2006.01)
*G01D 5/20* (2006.01)

(52) U.S. Cl.
CPC ............... *G01D 5/245* (2013.01); *G01B 7/30* (2013.01); *G01D 5/202* (2013.01); *G01D 5/2457* (2013.01)

(58) Field of Classification Search
CPC ...... G01D 5/245; G01D 5/202; G01D 5/2457; G01B 7/30
See application file for complete search history.

(56) References Cited

U.S. PATENT DOCUMENTS

| 6,828,783 B2 | 12/2004 | Schroter et al. |
| 2001/0004849 A1* | 6/2001 | Jin .................. G01D 5/2451 73/862.331 |

(Continued)

FOREIGN PATENT DOCUMENTS

| CN | 102749024 A | 10/2012 |
| CN | 103256885 A | 8/2013 |

(Continued)

OTHER PUBLICATIONS

WIPO, International Search Report dated Nov. 30 2016.
(Continued)

*Primary Examiner* — Tung X Nguyen
*Assistant Examiner* — Feba Pothen
(74) *Attorney, Agent, or Firm* — Li & Cai Intellectual Property (USA) Office

(57) ABSTRACT

Disclosed is an angle sensor, including a gear structure (1), an eddy current probe (2) and a processing unit (3), wherein the gear structure (1) is a gear mounted and fixed on the outer circumference of a rotating shaft or a gear formed by machining on the outer circumference of the rotating shaft, and a positioning structure (P) for feature angle recognition is provided on an outer circumferential side of the gear structure (1); the eddy current probe (2) is positioned at the outer circumferential side of the gear structure (1), and the (Continued)

eddy current probe (2) faces a gear tooth and a tooth groove of the gear; and the processing unit (3) is connected to the eddy current probe (2) and is used for processing signals and outputting an angle measurement signal. Also disclosed is an angle measurement method.

12 Claims, 4 Drawing Sheets

(56) References Cited

U.S. PATENT DOCUMENTS

| | | | | |
|---|---|---|---|---|
| 2003/0214283 | A1* | 11/2003 | Slates | G01B 7/003 |
| | | | | 324/207.16 |
| 2006/0100819 | A1 | 5/2006 | Grant et al. | |
| 2010/0312504 | A1* | 12/2010 | Rossi | G01H 1/003 |
| | | | | 702/56 |

FOREIGN PATENT DOCUMENTS

| | | |
|---|---|---|
| CN | 103256910 A | 8/2013 |
| CN | 103256911 A | 8/2013 |
| CN | 103630069 A | 3/2014 |
| CN | 103776365 A | 5/2014 |
| CN | 205079732 U | 3/2016 |
| CN | 105466332 A | 4/2016 |
| DE | 102004033082 A1 | 1/2006 |
| JP | 09131004 A | 5/1997 |
| KR | 20060094725 A | 8/2006 |

OTHER PUBLICATIONS

China Patent Office, Patent search report.
Raj Kamal, "Microcontrollers architecture, programming, interface, and system design", book published by Dorling Kindersley (India) Pvt Ltd., Publication Date: Sep. 30, 2009.

* cited by examiner

ANGLE SENSOR AND ANGLE MEASUREMENT METHOD BASED ON EDDY CURRENT EFFECT

CROSS-REFERENCE TO RELATED APPLICATIONS

The present application claims benefit of Chinese Patent Application No. 201510785432.2, entitled "angle sensor and angle measurement method", filed to China Patent Office on Nov. 13, 2015, the contents of which are hereby incorporated by reference in its entirety.

TECHNICAL FIELD

The embodiments of the disclosure relate to an angle sensor and an angle measurement method, and more particularly to an angle sensor based on an eddy current and an angle measurement method.

BACKGROUND

According to whether a sensor is in contact with an object to be measured, angle measuring sensors existing on the current market may be classified into two types: contact angle sensors and non-contact angle sensors.

Herein, the contact angle sensors mainly rely on a structure to be triggered. For example, Chinese Patent Application No. 201410074133.3 discloses an angle sensor, mainly including 2N ball switches. The 2N ball switches are sequentially mounted clockwise with front trigger ends and rear stable ends along the circumference, or sequentially mounted clockwise with front stable ends and rear trigger ends along the circumference. During angle measurement, each ball switch is triggered to set an angle thereon. When a rotating shaft rotates, an angle corresponding to a triggered ball switch will be output, so as to obtain a measurement result. However, the angle sensor is low in measurement accuracy, easily damaged, bulky, and cumbersome to maintain, and can only test an angle corresponding to rotation at a low speed.

On the other hand, the non-contact angle sensors mainly include photoelectric angle sensors and Hall angle sensors based on different measurement principles, wherein the photoelectric angle sensor runs a test by utilizing a photoelectric effect under a very demanding environment, will not work properly due to a little dust, a little vibration or a slight deviation of mounting, and needs photoemission and receiving devices that are bulky and expensive. An electromagnetic angle sensor runs a test by utilizing a Hall element, and consists mainly of a rotor and a stator. During operation, the mounting coaxiality of the stator and the rotor is very highly required. For example, a clearance between the stator and the rotor is generally less than 0.5 mm. In addition, a phenomenon such as scratching and locking will be caused due to a slight deflection of the rotating shaft, so this sensor cannot be applied to an angle test with a deflection rotating shaft.

Chinese utility model patent ZL201420138818.5 discloses an angle sensor based on eddy current effect. As shown in FIG. 6(a) and FIG. 6(b), the angle sensor includes a metal ring 51 that can be fixed to a rotating shaft, a first field coil group 52, and a second field coil group 53. The first field coil group 52 and the second field coil group 53 are respectively connected to a hardware circuit 54, wherein a first field coil and a second field coil are directly connected to the hardware circuit through a circuit board. When the rotating shaft 55 rotates, the field coils sense that an eddy current field generated by the metal ring 51 varies, and then the variation of the eddy current field is calculated by using backend processing equipment such as the hardware circuit 54, so as to obtain a measured angle.

However, the angle sensor disclosed by the utility model patent has the problems as follows. First, it needs to fix the metal ring on the rotating shaft, the shape of the metal ring is irregular, the mass distribution is not uniform, and the rotating inertia of the rotating shaft is likely to be uneven, thereby resulting in deflection of the rotating shaft. Second, a relative position of the field coil and the metal ring is strictly limited, the metal ring is fixed to the rotating shaft, the field coil and a detection coil are fixed to other structures, and when the deflection of the rotating shaft occurs during movement, an angle cannot be accurately tested. Thirdly, two field coils and two detection coils need to be arranged on both sides of the metal ring, which are bulky and cumbersome to mount. In addition, the angle sensor needs to be angle-calibrated before use, and therefore the workload is heavy.

SUMMARY

According to a first aspect of the disclosure, an angle sensor is provided. The angle sensor includes a gear structure, an eddy current probe and a processing unit, wherein the gear structure is a gear mounted and fixed on the outer circumference of a rotating shaft or a gear formed by machining on the outer circumference of the rotating shaft, and a positioning structure for feature angle recognition is provided on an outer circumferential side of the gear structure; the eddy current probe is positioned at the outer circumferential side of the gear structure, and the eddy current probe faces a gear tooth and a tooth groove of the gear; and the processing unit is connected to the eddy current probe and is used for processing signals and outputting an angle measurement signal.

In an embodiment of the disclosure, the positioning structure is a zero degree positioning structure.

In an embodiment of the disclosure, the positioning structure is a positioning groove, and more in an embodiment of the disclosure, the positioning groove is a positioning tooth groove or a sharp groove provided to be deeper than the tooth groove of the gear.

In an embodiment of the disclosure, the gear tooth and the tooth groove are evenly distributed.

In an embodiment of the disclosure, the axial centerline of the eddy current probe and the center axis of the rotating shaft perpendicularly intersect.

Further in an embodiment of the disclosure, an output signal of the eddy current probe is a series of crests and troughs corresponding to the tooth groove and the gear tooth, and corresponding to the positioning groove for the feature angle recognition, and the eddy current probe outputs a spike pulse higher than a crest corresponding to the tooth groove.

In an embodiment of the disclosure, the processing unit includes a signal acquisition module for receiving the output signal of the eddy current probe, and a signal processing module for calculating a signal output by the signal acquisition module to output an angle measurement signal.

In an embodiment of the disclosure, when a hardware circuit is packaged, an interface communicating with a Personal Computer (PC) is provided on the processing unit to store and display the angle measurement signal on the PC.

According to another aspect of the disclosure, an angle measurement method is provided. The method for angle measurement using the angle sensor as described above includes the steps as follows.

S1: An original pulse signal is input, that is, a processing unit receives an output signal of an eddy current probe.

S2: An angle feature signal is judged, that is, the processing unit recognizes a feature angle recognition signal corresponding to a positioning structure for feature angle recognition.

S3: An angle cycle signal is selected, that is, the processing unit selects one or more cycle angle signals.

S4: An angle measurement signal is calculated, that is, segmented processing is performed on the selected cycle angle signal to obtain an angle interval and an angle value of each segment, and an angle measurement signal representative of an angle measurement result is further obtained by using the angle interval and the angle value of each segment.

S5: An angle signal is output, that is, the angle measurement signal obtained in S4 is output.

In an embodiment of the disclosure, S4 includes:

S41: segmented processing is performed on an angle signal, that is, infinite segmented processing is performed on the selected cycle angle signal to obtain an angle value of each segment; and S42: angle signals of all segments are synthesized, that is, angle values within a cycle or all cycles are synthesized by using the angle value of each segment to serve as an angle measurement signal.

In an embodiment of the disclosure, in S41, a crest-trough point signal obtained from each tooth groove and gear tooth of the gear is defined as $x_0$ to $x_n$, and an angle between centerlines of the tooth groove and the gear tooth evenly distributed is defined as K, so the angle interval of each signal segment is:

$$\Delta x_0 = \frac{K}{x_1 - x_0}, \Delta x_1 = \frac{K}{x_2 - x_1}, \ldots, \Delta x_{n-1} = \frac{K}{x_n - x_{n-1}};$$

the angle value of each segment is:
1) $x_0$-$x_n$ interval angle sub-array
$x_0, x_0+\Delta x_0, x_0+2\Delta x_0, x_0+3\Delta x_0, \ldots, x_1$
2) $x_1$-$x_2$ interval angle sub-array
$x_1, x_1+\Delta x_1, x_1+2\Delta x_1, x_1+3\Delta x_1, \ldots, x_2$
...
n) $x_{n-1}$-$x_n$ interval angle sub-array
$x_{n-1}, x_{n-1}+\Delta x_{n-1}, x_{n-1}+2\Delta x_{n-1}, x_{n-1}+3\Delta x_{n-1}, \ldots, x_n$.

In an embodiment of the disclosure, in S42, angle synthesis is performed by using the following formula:

$x_0, x_0+\Delta x_0, x_0+2\Delta x_0, x_0+3\Delta x_0, \ldots, x_1, x_1+\Delta x_1, x_1+2\Delta x_1, x_1+3\Delta x_1, \ldots, x_2, \ldots, x_{n-1}, x_{n-1}+\Delta x_{n-1}, x_{n-1}+2\Delta x_{n-1}, x_{n-1}+3\Delta_{n-1}, \ldots, x_n$.

The specific solutions of the disclosure will be described below in conjunction with specific embodiments of the disclosure and the drawings, and the beneficial effects of the disclosure will be further clarified.

BRIEF DESCRIPTION OF THE DRAWINGS

The drawings described herein are used to provide a further understanding of the the disclosure, constitute a part of the disclosure, and are used to explain the disclosure, but do not constitute improper limits to the disclosure.

DETAILED DESCRIPTION OF THE EMBODIMENTS

To make the objectives, technical solutions and advantages of the disclosure clearer, the technical solutions of the disclosure will be clearly and completely described below with reference to specific embodiments of the disclosure and corresponding drawings. Obviously, the described embodiments are only a part of the embodiments of the disclosure and not all of the embodiments. All other embodiments obtained by a person of ordinary skill in the art based on the embodiments of the disclosure without creative efforts shall fall within the protection scope of the disclosure.

Figure 1:
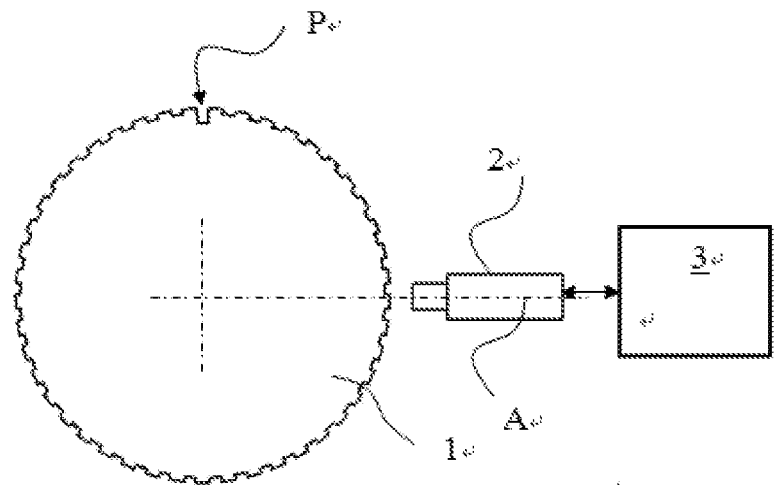
FIG. 1 is a structural schematic diagram of an angle sensor according to a preferred embodiment of the disclosure.

The angle sensor of the disclosure is an angle sensor based on an eddy current effect. FIG. 1 is a structural schematic diagram of an angle sensor according to a preferred embodiment of the disclosure. As shown in FIG. 1, the angle sensor includes a gear structure 1, an eddy current probe 2 and a processing unit 3. The gear structure is a gear mounted and fixed on the outer circumference of a rotating shaft or a gear formed by machining on the outer circumference of the rotating shaft. A positioning structure P for feature angle recognition, namely for angle positioning, is formed on an outer circumferential side of the gear structure, e.g., in a gear tooth and a tooth groove of the gear. The positioning structure is preferably a zero degree positioning structure, and of course, it may also be a positioning structure for other angles. The eddy current probe 2 is positioned at the outer circumferential side of the gear structure, and faces the gear tooth and the tooth groove, so as to detect the variation of an eddy current when the gear structure rotates. The processing unit 3 is connected to the eddy current probe 2 and is used for processing signals and outputting an angle measurement signal. In an embodiment of the disclosure, the processing unit 3 is a hardware signal processing unit integrally integrated and packaged with an algorithm program and the like.

Figure 2:
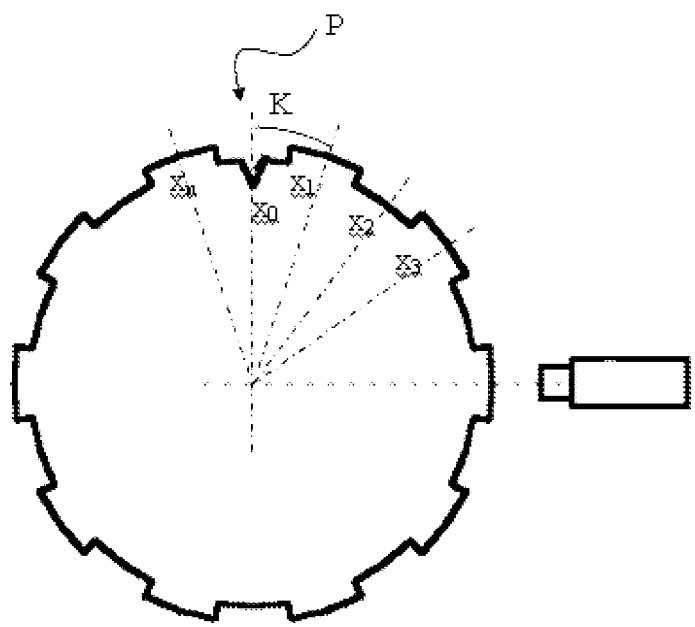
FIG. 2 is a structural schematic diagram of an angle sensor according to another preferred embodiment of the disclosure for describing a positioning structure.

The positioning structure P will be further described below with reference to FIG. 1 and FIG. 2. As shown in FIG. 1, when the number n of gear teeth and tooth grooves on the gear structure exceeds a predetermined range, for example, n is greater than 21, the positioning structure is preferably a groove that is formed at the position of the tooth groove and is deeper than the tooth groove. At this point, the angle sensor can achieve high-precision measurement results. FIG. 2 is a structural schematic diagram of an angle sensor according to another preferred embodiment of the disclosure for describing a positioning structure. The difference from the embodiment as shown in FIG. 1 is only the number of gear teeth and tooth grooves and the form of the positioning structure. Therefore, the description of the same parts as in FIG. 1 is omitted. As shown in FIG. 2, compared to the solution as shown in FIG. 1, the gear structure has a smaller number of gear teeth and tooth grooves, for example, n is smaller than 21, and the positioning structure is preferably a sharp groove that is formed at the position of the tooth groove and is deeper than the tooth groove. At this time, measurement accuracy is relatively low due to the relatively small number of tooth grooves and gear teeth of the gear structure.

In addition, the positioning structure may also be provided in other forms, for example, in a form of protrusions that are higher or lower than the gear teeth of the gear. It should be pointed out that the positioning structure can be recognized by the eddy current probe 2 in a manner of causing the variation of an eddy current, so that angle positioning can be performed.

The following describes the angle sensor of the disclosure in more detail by taking a gear mounted and fixed on the outer circumference of a rotating shaft as an example.

Firstly, a metal gear having n tooth grooves and gear teeth is mounted and fixed on the outer circumference of a rotating shaft, where the greater the value of n is, the more accurate the measurement result is. Therefore, it may be selected according to the required measurement accuracy. In the disclosure, it is preferably 21 to 81. In addition, it is preferable that the gear teeth and the tooth grooves are evenly distributed. The positioning structure P for feature angle recognition is provided at a certain position on the gear tooth and/or the tooth groove, and is used for recognizing a zero angle or other feature angles, so as to achieve angle positioning. By taking a case where the positioning structure P is a positioning groove deeper than the tooth groove as an example, a feature angle appears, on an output signal of the eddy current probe 2, to be higher than a constant voltage value of the output signal of the eddy current probe 2 corresponding to the tooth groove of the gear. That is, the tooth groove correspondingly outputs a crest, so the output of the positioning groove has a crest value higher than this crest.

Secondly, the eddy current probe 2 is disposed on the outer circumferential side of the gear structure, and in an embodiment of the disclosure, the axial centerline of the probe and the central axis (axis perpendicular to a paper surface in FIG. 1) of the rotating shaft perpendicularly intersect. At this time, the detection accuracy is highest. When the rotating shaft rotates, the eddy current probe 2 outputs a series of signal curves having multiple cycles along with the variation of a tooth groove clearance of the gear and having n crests (or troughs) corresponding to n grooves (teeth) within the cycle.

Figure 3:
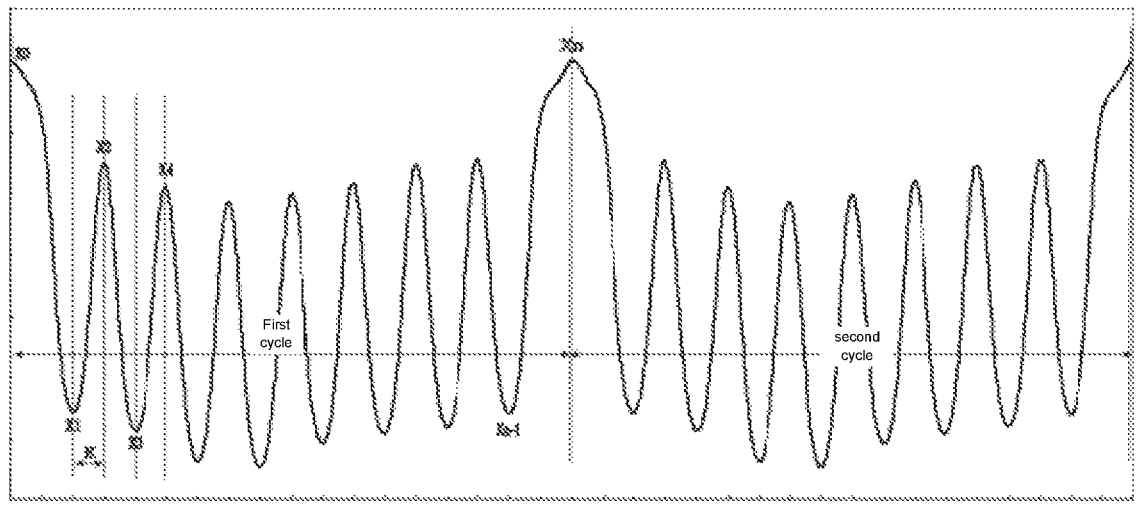
FIG. 3 shows signal curves output by an eddy current probe in a case where the positioning structure is a positioning groove.

FIG. 3 shows signal curves output by an eddy current probe 2 in a case where the positioning structure is the positioning groove. As shown in FIG. 3, an output signal of the eddy current probe 2 is a series of crests and troughs corresponding to the tooth groove and the gear tooth, and corresponding to the positioning groove for the feature angle recognition, and the eddy current probe 2 outputs a spike pulse PK (as shown in FIG. 3) apparently higher than other tooth groove waveforms.

Figure 4:
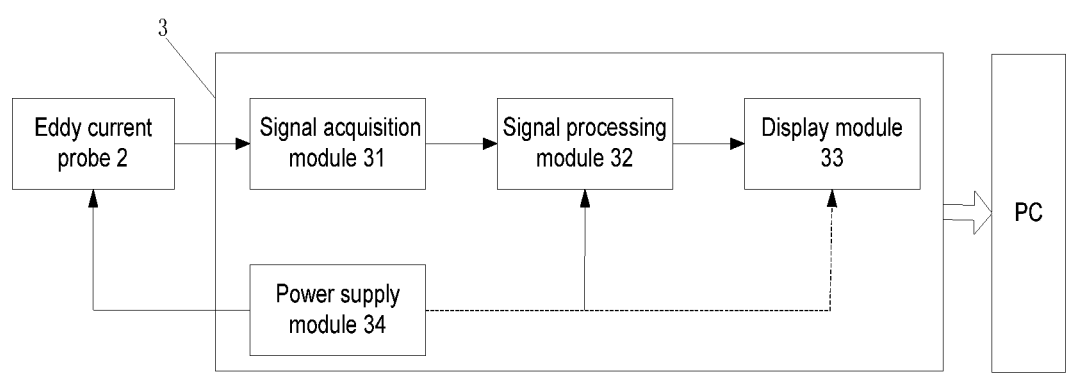
FIG. 4 is a structural schematic diagram of a processing module according to a preferred embodiment of the disclosure.

Finally, the processing unit 3 is used for acquiring and processing an angle signal. FIG. 4 is a structural schematic diagram of a processing unit according to a preferred embodiment of the disclosure. As shown in FIG. 4, the eddy current probe 2 outputs a detection signal to the processing unit 3. The processing unit 3 preferably includes a signal acquisition module 31 that receives the detection signal output by the eddy current probe 2, and a signal processing module 32 that processes the acquired signal by using a built-in algorithm program to obtain an angle signal representative of a detection result and outputs the signal. In an embodiment of the disclosure, the processing unit 3 includes a display module 33 such as a Light Emitting Diode (LED) display, for displaying the angle signal output from the signal processing module 32. Alternatively, the processing unit 3 may set an interface for communicating with a PC when a hardware circuit is packaged, so that the display module 33 may be omitted, and the PC may be used to display and store the angle signal output by the signal processing module 32. The above-mentioned angle signal displayed on the display device may be a real-time curve graph representative of an angle signal, or may be a curve graph of an angle signal within a predetermined period of time. At the same time, the measured angle signal may also be stored in the PC.

In addition, it is further preferable that the processing unit 3 includes a power supply module 34 for supplying power to each module in the processing unit 3 and supplying power to the eddy current probe. Of course, an integrated power supply module may be additionally provided to supply power to each of the above components.

Figure 5:
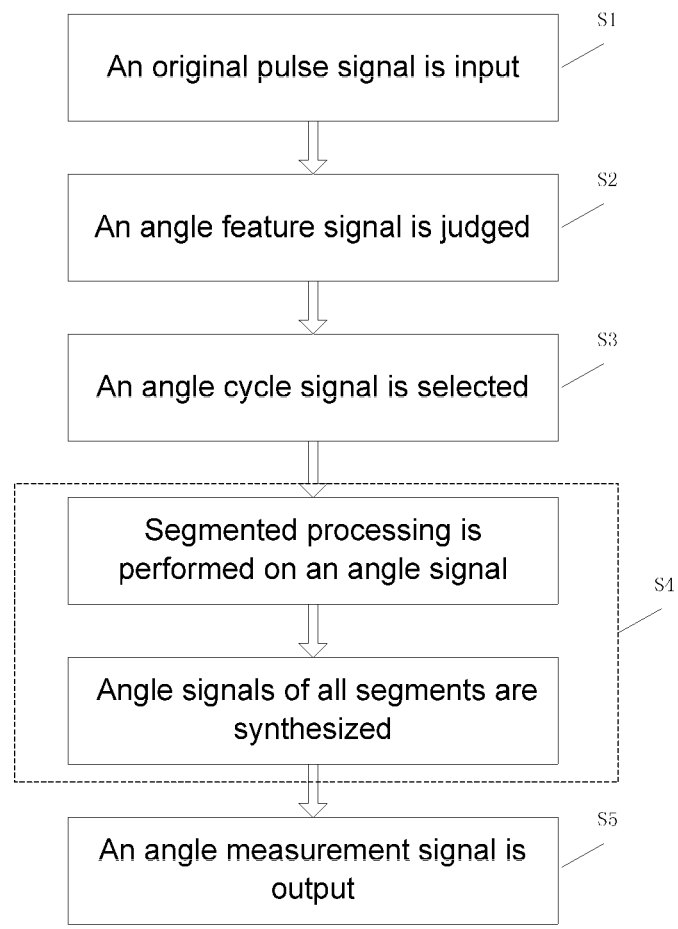
FIG. 5 is a flowchart of angle measurement processing according to a preferred embodiment of the disclosure.
Figure 6A:
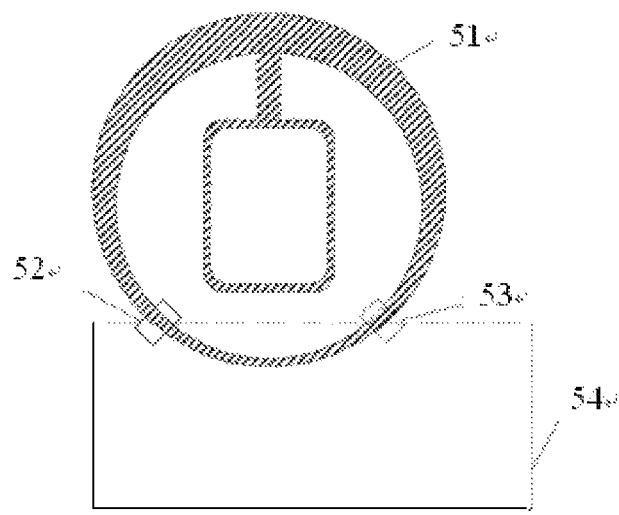
FIG. 6(a) and FIG. 6(b) are structural schematic diagrams of an angle sensor in the related art.
Figure 6B:
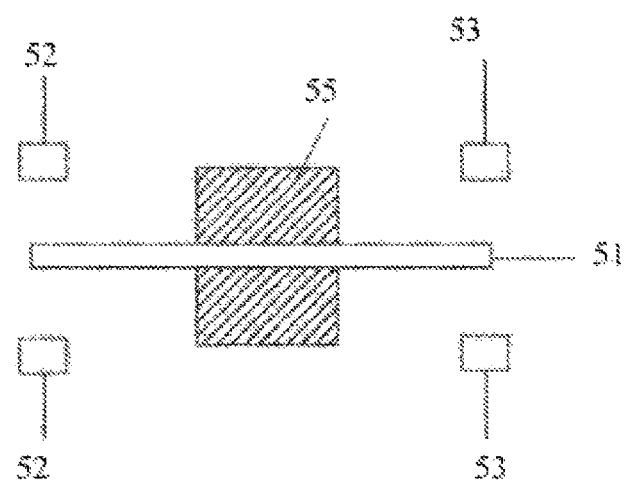

An angle measurement method of the angle sensor of the disclosure will be described below with reference to FIG. 5. FIG. 5 is a flowchart of angle measurement processing according to the disclosure. As shown in FIG. 5, the angle measurement method includes the steps as follows.

S1: An original pulse signal is input, that is, a signal acquisition module 31 of a processing unit 3 transmits an acquired output signal of an eddy current probe 2 to a signal processing module 32.

S2: An angle feature signal is judged, that is, the signal processing module 32 recognizes a feature angle recognition signal, such as a spike pulse PK as shown in FIG. 3, corresponding to a positioning structure for feature angle recognition, such as a positioning groove.

S3: An angle cycle signal is selected, that is, one or more cycle angle signals are selected, wherein a gear structure rotates one turn in correspondence to one cycle signal. Specifically, one or more cycle angle signals may be automatically selected by means of the above-mentioned spike pulse PK and a built-in algorithm program to determine a feature angle signal at the spike pulse.

S4: An angle measurement signal is calculated, that is, segmented processing is performed on the selected cycle angle signal to obtain an angle interval and an angle value of each segment, and an angle measurement signal representative of an angle measurement result is further obtained by using the angle interval and the angle value of each segment.

Specifically,

S41: segmented processing is performed on an angle signal, that is, an infinite segmentation idea is applied to the selected cycle angle signal (that is, the selected data signal segment is composed of multiple data sampling points, and an angle interval is divided between every two adjacent data sampling points) to perform segmented processing. Selection of a cycle angle signal is taken as an example. For a gear with n tooth grooves, as shown in FIG. 2, a crest-trough point signal obtained from each tooth groove and gear tooth of the gear is defined as $x_0$ to $x_n$, and an angle between centerlines of the tooth groove and the gear tooth evenly distributed is defined as K, so the angle interval of each data signal segment is:

$$\Delta x_0 = \frac{K}{x_1 - x_0}, \Delta x_1 = \frac{K}{x_2 - x_1}, \ldots, \Delta x_{n-1} = \frac{K}{x_n - x_{n-1}};$$

the angle value of each segment is:
1) $x_0$-$x_n$ interval angle sub-array
$x_0, x_0+\Delta x_0, x_0+2\Delta x_0, x_0+3\Delta x_0, \ldots, x_1$
2) $x_1$-$x_2$ interval angle sub-array
$x_1, x_1+\Delta x_1, x_1+2\Delta x_1, x_1+3\Delta x_1, \ldots, x_2$
...
n) $x_{n-1}$-$x_n$ interval angle sub-array
$x_{n-1}, x_{n-1}+\Delta x_{n-1}, x_{n-1}+2\Delta x_{n-1}, x_{n-1}+3\Delta x_{n-1}, \ldots, x_n$.

S42: Angle signals of all segments are synthesized, that is, angle values within one cycle or all cycles are synthesized by using the angle value of each segment. Specifically, the following formula is adopted:

$x_0, x_0+\Delta x_0, x_0+2\Delta x_0, x_0+3\Delta x_0, \ldots x_1, x_1+\Delta x_1, x_1+2\Delta x_1,$
$x_1+3\Delta x_1, \ldots x_2, \ldots, x_{n-1}, x_{n-1}+\Delta x_{n-1}, x_{n-1}+$
$2\Delta x_{n-1}, x_{n-1}+3\Delta_{n-1}, \ldots x_n$.

In addition, multiple cycle angle values are equally available.

S5: An angle signal is output, that is, the angle values within one cycle or all cycles obtained in S4 are displayed on a display module 33 of the processing unit 3 or displayed and stored on a PC.

The angle sensor and the angle measurement method of the disclosure have been described above. The angle sensor and the angle measurement method according to the disclosure may be applied in an environment of high temperature, high pressure, high speed, dust, refrigerant, water immersion, oil immersion, and partial electromagnetic interference. The application is extensive, and there are no more environmental restrictions. An algorithm program used in the solution of the disclosure may implement zero degree automatic angle recognition, and may automatically calculate and output an angle at each moment, the accuracy is as high as ±0.1°, and no calibration is needed. The distance between an eddy current probe and a rotating shaft may be flexibly adjusted according to the measuring range of the probe. Even if the rotating shaft has a certain degree of deflection under high speed operation, accurate and highly-precise angle output may be achieved, thereby effectively solving the problem of influence on angle accuracy caused by long-term deflection in the industry. In addition, in the disclosure, processed gear teeth may be directly fixed to the rotating shaft, or may be directly processed into a gear tooth shape at a certain position on the rotating shaft. It is only necessary to mount an eddy current probe on the side of the rotating shaft. The structural design is simple, the size is small, and the mounting operation is convenient.

Meanwhile, a processing unit for implementing angle signal output according to the disclosure includes a signal acquisition module and a signal processing module. The two modules may be integrally integrated and packaged, and an algorithm is built in the signal processing module. The packaged module has an interface for communicating with a PC. It may be very intuitive to display a current real-time angle value or an angle curve of a certain period of time on the PC, and it may also easily save historical angle data.

The foregoing descriptions are merely exemplary embodiments of the disclosure and are not intended to limit the disclosure. For those skilled in the art, the disclosure may have various changes and modifications. Any modification, equivalent replacement and improvement made within the spirit and principle of the disclosure shall fall within the scope of the claims of the disclosure.

What is claimed is:

1. An angle sensor, comprising:
a gear structure, one eddy current probe and a processing unit, wherein
the gear structure is a gear mounted and fixed on an outer circumference of a rotating shaft or a gear formed by machining on the outer circumference of the rotating shaft, and a positioning structure for recognizing a feature angle is provided on an outer circumferential side of the gear structure;
the eddy current probe is positioned at the outer circumferential side of the gear structure, and the eddy current probe faces a gear tooth and a tooth groove of the gear; and
the processing unit is connected to the eddy current probe and is configured to process signals and output an angle measurement signal, wherein the angle measurement signal is determined through the following process: selecting an angle cycle signal, where one or more cycle angle signals are selected from a feature angle recognition signal; calculating the angle measurement signal, where segmented processing is performed on the selected cycle angle signal to obtain an angle interval and an angle value of each segment, and an angle measurement signal representative of an angle measurement result is obtained by using the angle interval and the angle value of each segment;
wherein selecting the angle cycle signal where the one or more cycle angle signals are selected from the feature angle recognition signal; calculating the angle measurement signal comprises: performing segmented processing on the cycle angle signal where infinite segmented processing is performed on the selected cycle angle signal to obtain the angle value of each segment; and synthesizing angle signals of all segments, where angle values of a cycle or all cycles are synthesized by using the angle value of each segment to serve as the angle measurement signal.

2. The angle sensor as claimed in claim 1, wherein the positioning structure is a zero degree positioning structure.

3. The angle sensor as claimed in claim 1, wherein the positioning structure is a positioning groove.

4. The angle sensor as claimed in claim 3, wherein the positioning groove is a positioning tooth groove or a sharp groove provided to be deeper than the tooth groove of the gear.

5. The angle sensor as claimed in claim 1, wherein the gear tooth and the tooth groove are evenly distributed.

6. The angle sensor as claimed in claim 1, wherein an axial centerline of the eddy current probe and the center axis of the rotating shaft perpendicularly intersect.

7. The angle sensor as claimed in claim 3, wherein an output signal of the eddy current probe is a series of crests and troughs corresponding to the tooth groove and the gear tooth, and corresponding to the positioning groove for the feature angle recognition, and the eddy current probe outputs a spike pulse higher than a crest corresponding to the tooth groove.

8. The angle sensor as claimed in claim 1, wherein the processing unit comprises a signal acquisition module for receiving an output signal of the eddy current probe, and a signal processing module for calculating a signal output by the signal acquisition module to output the angle measurement signal.

9. The angle sensor as claimed in claim 8, wherein
when a hardware circuit is packaged, an interface communicating with a Personal Computer (PC) is provided on the processing unit to store and display the angle measurement signal on the PC.

10. An angle measurement method for angle measurement using the angle sensor as claimed in claim 1, the method comprising:
S1: inputting an original pulse signal, where an output signal of an eddy current probe is received;
S2: judging an angle feature signal, where a feature angle recognition signal corresponding to a positioning structure for feature angle recognition is recognized based on the output signal;
S3: selecting an angle cycle signal, where one or more cycle angle signals are selected from the feature angle recognition signal;
S4: calculating the angle measurement signal, the selected cycle angle is segmented to obtain an angle interval and an angle value of each segment, and the angle measurement signal representative of an angle measurement result is obtained by using the angle interval and the angle value of each segment; and
S5: outputting the angle measurement signal, where the angle measurement signal obtained in S4 is output;
Wherein S4 specifically comprises: S41: performing segmented processing on the cycle angle signal where infinite segmented processing is performed on the selected cycle angle signal to obtain the angle value of each segment; and S42: synthesizing angle signals of all segments, where angle values of a cycle or all cycles are synthesized by using the angle value of each segment to serve as the angle measurement signal.

11. The method as claimed in claim 10, wherein
in S41, a crest-trough point signal obtained from each tooth groove and gear tooth of the gear is defined as $x_0$ to $x_n$, and an angle between centerlines of the tooth groove and the gear tooth evenly distributed is defined as K, so the angle interval of each signal segment is:

$$\Delta x_0 = \frac{K}{x_1 - x_0}, \Delta x_1 = \frac{K}{x_2 - x_1}, \ldots, \Delta x_{n-1} = \frac{K}{x_n - x_{n-1}};$$

the angle value of each segment is:
1) $x_0$-$x_n$ interval angle sub-array
$x_0, x_0+\Delta x_0, x_0+2\Delta x_0, x_0+3\Delta x_0, \ldots, x_1$
2) $x_1$-$x_2$ interval angle sub-array
$x_1, x_1+\Delta x_1, x_1+2\Delta x_1, x_1+3\Delta x_1, \ldots, x_2$
$\ldots$
n) $x_{n-1}$-$x_n$ interval angle sub-array
$x_{n-1}, x_{n-1}+2\Delta x_{n-1}, x_{n-1}+2\Delta x_{n-1}, x_{n-1}+3\Delta x_{n-1}, \ldots, x_n$.

12. The method as claimed in claim 11, wherein
in S42, angle synthesis is performed by using the following formula:

$x_0, x_0+\Delta x_0, x_0+2\Delta x_0, x_0+3\Delta x_0, \ldots x_1, x_1+\Delta x_1, x_1+2\Delta x_1, x_1+3\Delta x_1, \ldots x_2, \ldots, x_{n-1}, x_{n-1}+\Delta x_{n-1}, x_{n-1}+2\Delta x_{n-1}, x_{n-1}+3\Delta x_{n-1}, \ldots x_n$.

\* \* \* \* \*